INVENTORS
Thomas R. Beveridge
Benjamin N. Snyder
BY
D.D. McGraw
Their Attorney

Sept. 5, 1967  T. R. BEVERIDGE ETAL  3,339,664
VEHICLE SPEED CONTROL MECHANISM
Filed Jan. 29, 1965  4 Sheets-Sheet 2

INVENTORS
Thomas R. Beveridge
BY Benjamin N. Snyder

D. D. McGraw
Their Attorney

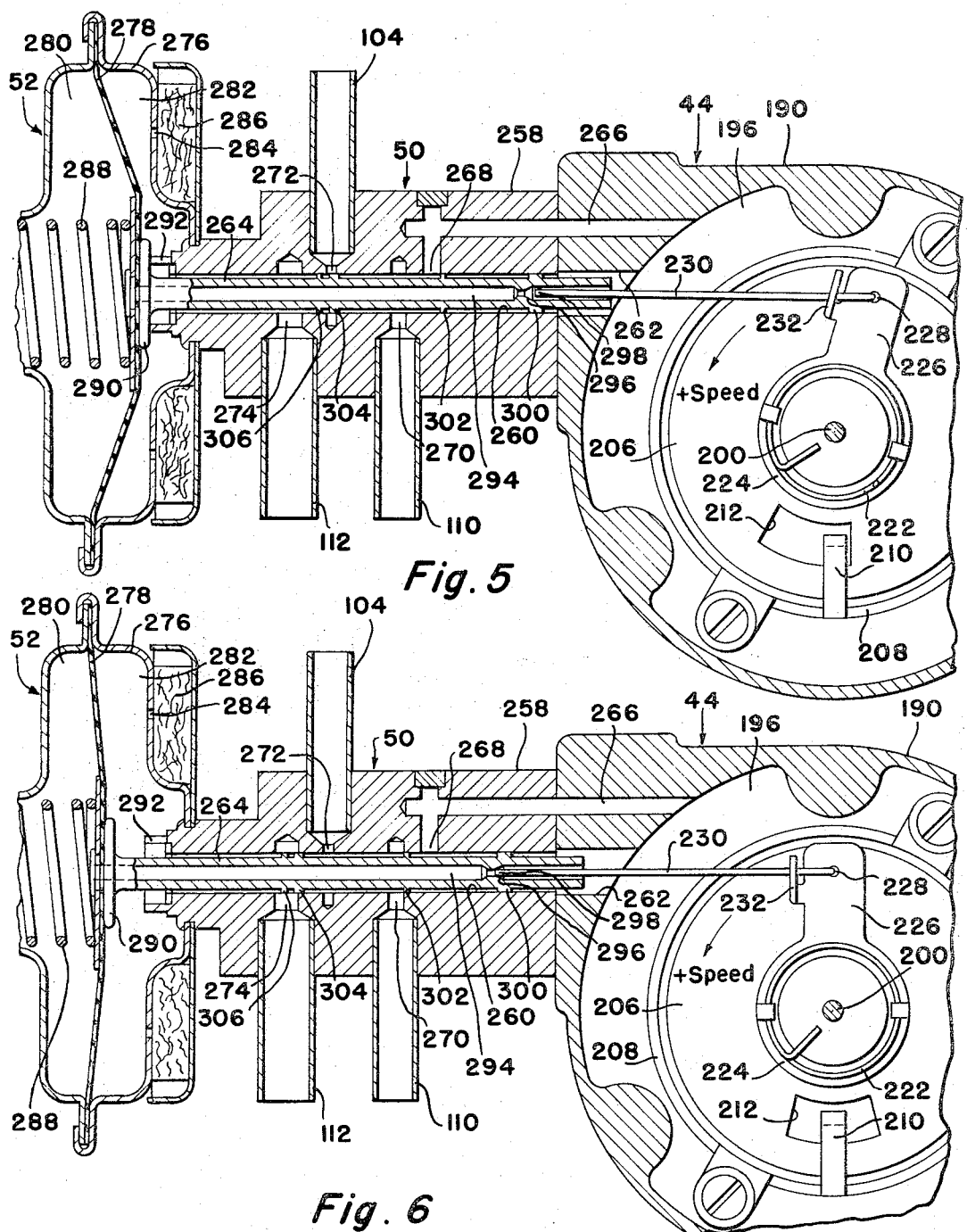

United States Patent Office 3,339,664
Patented Sept. 5, 1967

3,339,664
VEHICLE SPEED CONTROL MECHANISM
Thomas R. Beveridge, Spencerport, N.Y., and Benjamin N. Snyder, Orchard Lake, Mich., assignors to General Motors Corporation, Detroit, Mich., a corporation of Delaware
Filed Jan. 29, 1965, Ser. No. 429,100
15 Claims. (Cl. 180—108)

The invention relates to control mechanism which may take the form of a vehicle speed warning and speed maintaining system. A system of this type embodying the invention may be a fluid pressure system which is utilized to either maintain or limit vehicle speed. The invention also relates to fluid pressure responsive apparatus including servomotor means and control means for controlling the servomotor means. The invention also relates to a governing system for association with a vehicle. Other aspects of the invention include certain fluid control mechanism which is magnetically operated, and a control valve assembly.

Figure 3:
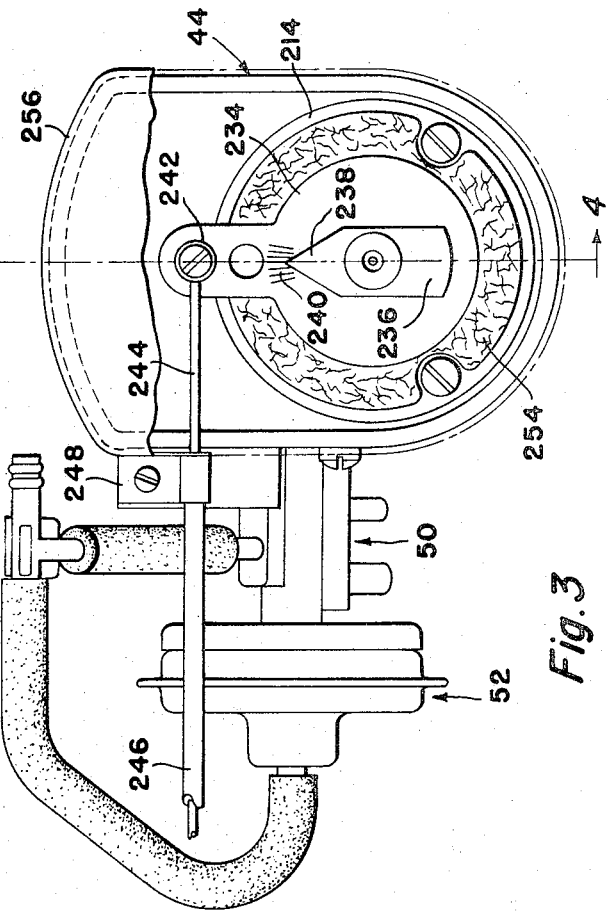
FIGURE 3 is an illustration of another portion of the system of FIGURE 1, with parts broken away and in section, and showing that portion in greater detail.
Figure 4:
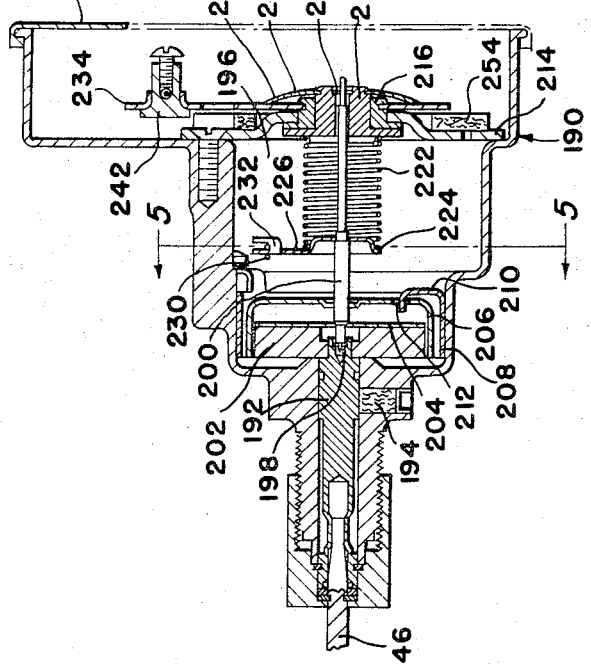
FIGURE 4 is a cross section view of the mechanism of FIGURE 3 taken in the direction of arrows 4—4 of that figure.

FIGURES 5, 6, 7 and 8 are cross sectional views of the mechanism of FIGURES 3 and 4, taken in the direction of arrows 5—5 shown in FIGURE 4, and showing the mechanism in various operating conditions.

Figure 1:
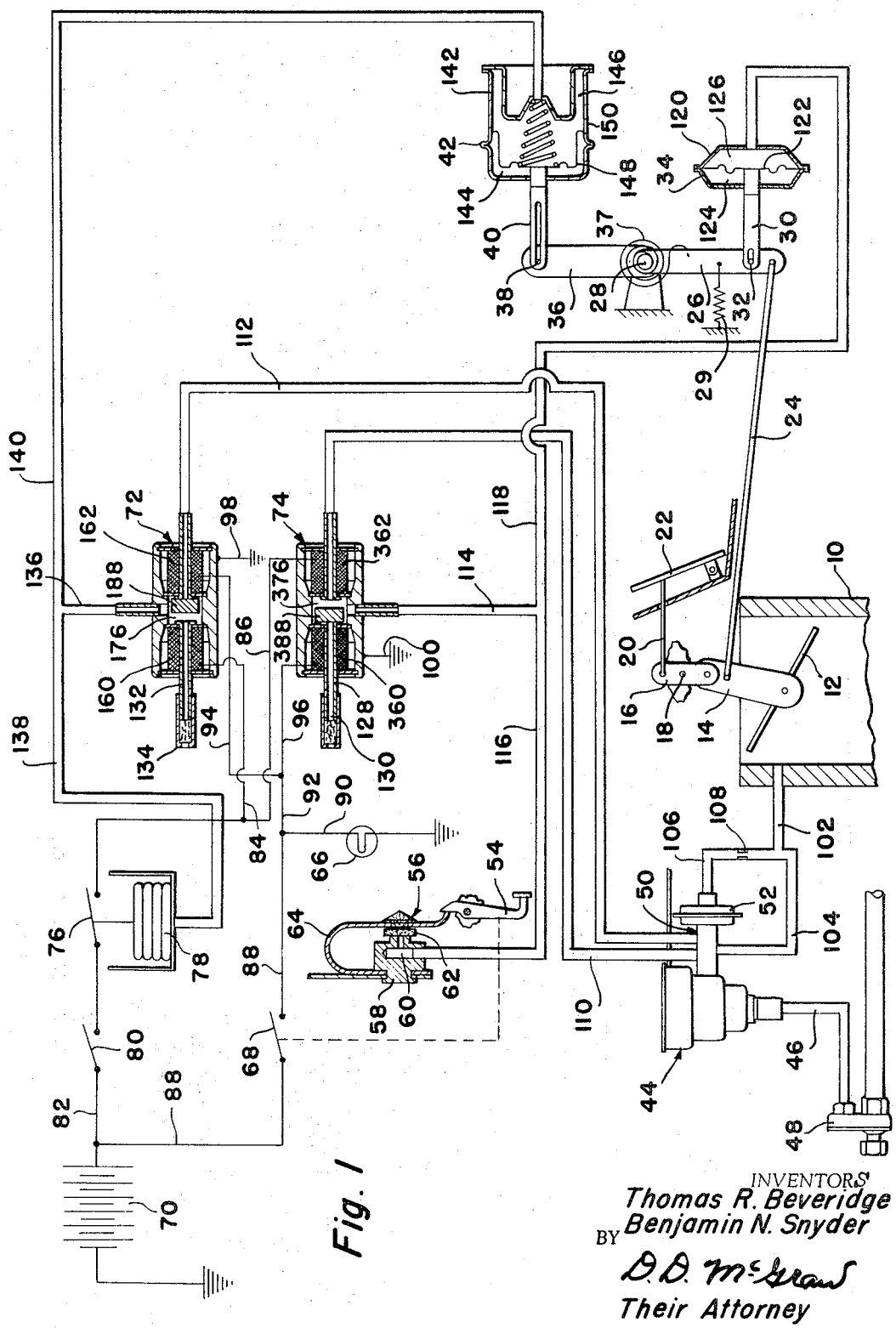
FIGURE 1 is a schematic illustration of the system embodying the invention, with parts broken away and in section.

The system is schematically illustrated in FIGURE 1. The vehicle engine 10 is provided with a throttle valve 12 which controls the engine speed and power. The throttle valve is actuated by an arm 14. The arm is connected to a link 16 pivoted at 18 on a suitable portion of the vehicle. A link 20 is connected to link 16 at one end and the accelerator pedal 22 at the other end so that depression of the accelerator pedal causes the throttle valve to move in an opening direction. Another link 24 is connected to arm 14 and also to a link 26 pivoted at 28 in a suitable portion of the vehicle. A throttle closing and accelerator pedal return spring 29 is attached to a suitable portion of the throttle linkage so that it urges the throttle valve toward the closed position and the accelerator pedal 22 to the corresponding raised position. Spring 29 is schematically illustrated as being a tension spring connected to link 26 and a fixed portion of the vehicle. An arm 30 is connected to link 26 by a lost motion connection 32, illustrated as a pin and slot arrangement. Arm 30 is the power arm of a servomotor 34. Another link 36 is also pivoted at 28. Links 26 and 36 are arranged so that pivotal movement of one link about pivot 28 normally moves the other link as if the two links were one. A spring 37 is schematically illustrated as a torsion spring providing an overload or force responsive relative motion connection between links 26 and 36 so that under certain conditions link 26 may be allowed to be moved relative to link 36 by the yielding action of spring 37. Link 36 is connected by a pin and slot lost motion connection 38 to arm 40. Arm 40 is the power arm of the servomotor 42.

The system also includes a vehicle speed sensor mechanism 44 driven by a rotatable cable 46 which is in turn driven by a suitable mechanism 48 at a speed corresponding to the actual vehicle speed. A control valve assembly 50 is connected to the speed sensor and is actuated by a servomotor 52. The vehicle brake pedal 54 is connected to a spoiler valve assembly 56 in such a manner that the valve assembly is closed when there is no force exerted on the brake pedal. The valve assembly includes a housing 58 suitably mounted to a portion of the vehicle and having a passage 60 one end of which is normally closed by the valve 62. Valve 62 is mounted on a spring 64. The force of spring 64 is resisted by the brake pedal when the brakes are released. This force is permitted to move the valve 62 away from housing 58, and particularly passage 60, when the brakes are applied.

The usual vehicle brake light 66 is energized by the closing of the brake actuated switch 68. The system also includes a suitable source of electrical energy such as the vehicle battery 70. Two solenoid assemblies are also provided. The solenoid valve assembly 72 is a speed warning solenoid valve assembly. The solenoid valve assembly 74 is a speed control solenoid valve assembly. One of the valve assemblies is illustrated in greater detail in FIGURE 2. The speed sensor 44, control valve 50, and valve servomotor 52 are illustrated in various conditions of operation in FIGURES 5–8.

The system also includes a normally open pressure switch 76 which is connected so as to be closed by a servomotor 78, here illustrated as a bellows. Switch 76 is in series with battery 70, as is a normally open reset switch 80.

The electrical portion of the system includes circuits energized by battery 70. Electrical lead 82 from battery 70 contains switches 80 and 76 and is then connected to electrical leads 84 and 86. Lead 84 is connected to assembly 72, and lead 86 is connected to assembly 74, in a manner to be described. An electrical lead 88 is connected to lead 82 intermediate battery 70 and reset switch 80, and contains the brake switch 68. Electrical lead 90 is connected to electrical lead 88 and contains brake light 66. Lead 90 is then grounded. Another electrical lead 92 is connected to lead 88 intermediate brake light 66 and switch 68, and is in turn connected to electrical leads 94 and 96. Electrical lead 94 is connected to a part of the assembly 72 and electrical lead 96 is connected to a part of the assembly 74 in a manner to be described. Electrical lead 98 is provided to ground the housing of assembly 72, and electrical lead 100 similarly grounds the housing of assembly 74.

The fluid pressure system is illustrated as being operative by the use of intake manifold vacuum as a fluid pressure other than atmospheric pressure. Therefore the vehicle engine intake manifold provides a convenient source of pressure. However, other sources of fluid pressure may be utilized since the pressure source provides only power and no other characteristics thereof are utilized by the system. The system includes a conduit 102 connected with the engine beyond the throttle valve 12 so that intake manifold vacuum is established in conduit 102. Conduits 104 and 106 are suitably connected to conduit 102, as with a T connection. A restriction 108 is provided in conduit 106. Conduit 106 leads to the valve servomotor 52 while conduit 104 leads to the control valve 50. A conduit 110, which may be referred to as the speed control conduit, connects the control valve 50 with one side of the speed control valve assembly 74. Another conduit 112, which may be referred to as the speed warning conduit, connects the control valve assembly 50 with one side of the speed warning valve assembly 72. A conduit 114 leads from the center portion of the speed control valve assembly 74 and branches into conduits 116 and 118. Conduit 118 is connected to the speed control servomotor 34. Conduit 116 is connected to passage 60 of the spoiler valve assembly housing 58. The speed control servomotor 34 includes a housing 120 containing a diaphragm 122 dividing the housing into a chamber 124 vented to atmosphere and a chamber 126 to which conduit 118 is connected. Arm 30 is connected so as to be moved by the diaphragm 122 to urge the throttle valve toward the open position when vacuum is present in chamber 126.

Conduit 128 provides an atmospheric air inlet 130 into the other side of assembly 74. A suitable filter may be provided in inlet 130.

Conduit 132 is connected to an atmospheric air inlet 134 and conducts atmospheric air to the interior of assembly 72. Conduit 136 is connected with assembly 132 and branches into conduits 138 and 140. Conduit 138 leads to the servomotor 78. Conduit 140 leads to the speed warning servomotor 42. Servomotor 42 is formed to include a housing 142 divided by the diaphragm 148 into an atmospheric chamber 144 and a variable pressure chamber 146. Conduit 140 is fluid connected with chamber 146. Arm 40 is secured to diaphragm 148 so as to be movable to the right as seen in FIGURE 1 when vacuum is introduced into chamber 146. A spring 150 urges diaphragm 144 and arm 40 to the left so that the arm and diaphragm are positioned on the left side of the housing 142 when the pressure in chambers 144 and 146 are the same.

The valve assemblies 72 and 74 are substantially identical. Therefore, only valve assembly 72 is shown in enlarged detail in FIGURE 2. Valve assembly 74 is identical in construction, with its associated conduit 110 being connected at the same relative place where conduit 112 is connected to assembly 72. The same relationship is true for conduit 128 relative to conduit 132 and conduit 114 relative to conduit 136.

The assembly 72 includes a housing 150 which has a central bore 152 and recesses 154 and 156 formed on either side of the bore and opening to the opposite ends of the housing. Conduit 136 extends into a port 158 formed in the side of the housing and connecting with bore 152. A solenoid coil 160 is received in recess 154 and a solenoid coil 162 is received in recess 156. The solenoid coils are respectively provided with cores 164 and 166 extending therethrough. The cores are respectively provided with inner heads 168 and 170 positioned in spaced relation within bore 152. Retainer plates 172 and 174 are sealingly mounted in the inner ends of recesses 154 and 156 so as to cooperate with bore 152 to provide a valve chamber 176. Port 158 is in fluid communication with this chamber. Plates 172 and 174 receive solenoid cores 164 and 166 therethrough in sealed relation. Each core is made of a magnetically non-retentive material which, however, is magnetically excitable when the associated solenoid coil is electrically energized. The cores are therefore commonly referred to as soft cores. Each core is centrally bored to respectively provide axially extending passages 178 and 180 therein. Passage 178 opens through core head 168 to provide a port 182. Passage 180 opens through core head 170 to provide a port 184. The ports provide fluid communication between the core passages and chamber 176. The outer end of core 164 forms conduit 132 to which the filtered air inlet 134 is secured. The outer end 186 of core 166 is connected to conduit 112. The electrical lead 84 is electrically connected to one end of the winding forming coil 160 and electrical lead 94 is electrically connected to one end of the winding forming coil 162. The other ends of the coils are electrically connected to housing 150, which is grounded by electrical lead 98. The coil 160 is so wound that the head 168 is a magnetic north pole, and coil 162 is so wound that the head 170 of its core is a south pole, when the respective coils are electrically energized. A valve block 188 is received in chamber 176 so it may be movable between the two solenoid cores. It is provided with surfaces engageable with heads 168 and 170 to selectively close ports 182 and 184. The valve block 188 is made of a magnetic material and is polarized so that it has a permanent magnetic north pole adjacent the north coil 160 and a permanent magnetic south pole adjacent the south coil 162. When coil 160 is energized, valve block 188 is magnetically repelled from core head 168 so that it engages core head 170. Since core head 170 is not magnetized at this time because coil 162 is not energized, the south pole face of block 188 magnetically attracts the block and holds it to head 170 holding port 184 closed. Of course, port 182 is open. When coil 160 is deenergized the valve block will remain in this position due to the magnetic attraction between the block and the soft core 166. However, when coil 162 is energized, core 166 and, therefore, core head 170 becomes a magnetic south pole, repelling block 188 and engaging it with the head 168 of core 164. Since at this time solenoid coil 160 is not energized, the permanent north pole of block 188 is attracted to the soft core head 168 and held in that position. Thus when coil 162 is deenergized, block 188 will remain in that position, keeping port 182 closed.

FIGURE 3 is an external view of the assembly formed by the speed sensor 44, the control valve assembly 50, and the valve servomotor 52. FIGURE 4 is a cross section view of a portion of the mechanism of FIGURE 3 and particularly illustrating the vehicle speed sensing mechanism and the vehicle reference speed setting mechanism. The speed sensing mechanism includes a housing 190, one end of which receives the vehicle speed cable 46. A drive shaft 192 is rotatably received in one end of housing 190 and is suitably lubricated by the oil wick 194. The end of cable 46 fits within the outer end of drive shaft 192 so that the drive shaft is rotated by the cable. The inner end of shaft 192 extends within the chamber 196 formed in the central portion of housing 190 and is formed to provide a bearing 198 for the eddy current cup axle 200. A magnetic disc 202, provided with a magnetic temperature compensator plate 204, is secured to the inner end of shaft 192 about bearing section 198 so that the magnetic disc is rotated by shaft 192. A speed cup 206 is mounted on axle 200 and receives the magnetic disc 202 in a typical speedometer pick up arrangement. A flux collector ring 208 is secured to the inside of housing 190 circumferentially about speed cup 206. A tab 210 formed from ring 208 is bent to extend into an arcuate slot 212 formed in a part of cup 206. Slot 212 may subtend through an angle of about 30°. A cover plate 214 fits over the center portion of housing 190 to close the upper end of chamber 196. The central portion of the cover plate has a bushing 216 rotatably mounted therein in which an upper spring retainer and bearing mount 218 is rotatably received. The upper end of axle 200 is received within bearing 220. The upper end of torsion spring 222 is retained by upper spring retainer 218. A lower spring retainer 224 is fitted about shaft 200 generally adjacent the speed cup 206 so that the spring 222 is mounted between the two retainers and about axle 200. The lower end of the spring is secured to retainer 224 by any suitable means. Retainer 224 is provided with an arm 226 which extends radially outward. As is best seen in FIGURES 5–8, arm 226 has an aperture 228 in which the end of valve rod 230 is hooked, and a rod retaining tab 232. The tab is so constructed as to permit the rod to assume the various positions shown in FIGURES 5–8.

The mechanism for setting the desired or reference speed applies a torsional force to spring 222 which becomes a reference speed signal. The mechanism includes a speed control lever 234 secured to bushing 216 so that angular movement of the lever results in rotating movement of the bushing and the upper spring retainer 218 to which the upper end of spring 222 is secured. This rotation is accomplished through a calibrating spring 236. Spring 236 is a leaf spring having its center secured to the upper end of spring retainer 218 and its ends built downwardly so that they engage the upper surface of lever 234 with sufficient force to provide a clutch-like drive. One end 238 of spring 236 may be pointed so that it can cooperate with serrations 240 formed in the upper surface of lever 234. The serrations 240 are arcuately spaced and positioned so that adjustment of the spring retainer 218 relative to the lever 234 may be made. The outer end of lever 234 is provided with a swivel 242 to which the reference speed set cable 244 is secured. Cable 244 extends outwardly through a side wall of housing 190. The cable sheath 246 is held in position by the cable sheath clamp 248 so that linear movement of cable 244 in its sheath results in angular movement of arm 234. A suitable operator controlled mechanism may be provided whereby linear movement of cable 244 is permitted throughout a reference speed range.

A filter 254 fits over the cover plate 214, and particularly over apertures in this plate, to keep foreign matter out of the chamber 196. A suitable cover 256 covers the upper end of housing 190.

Figure 7:
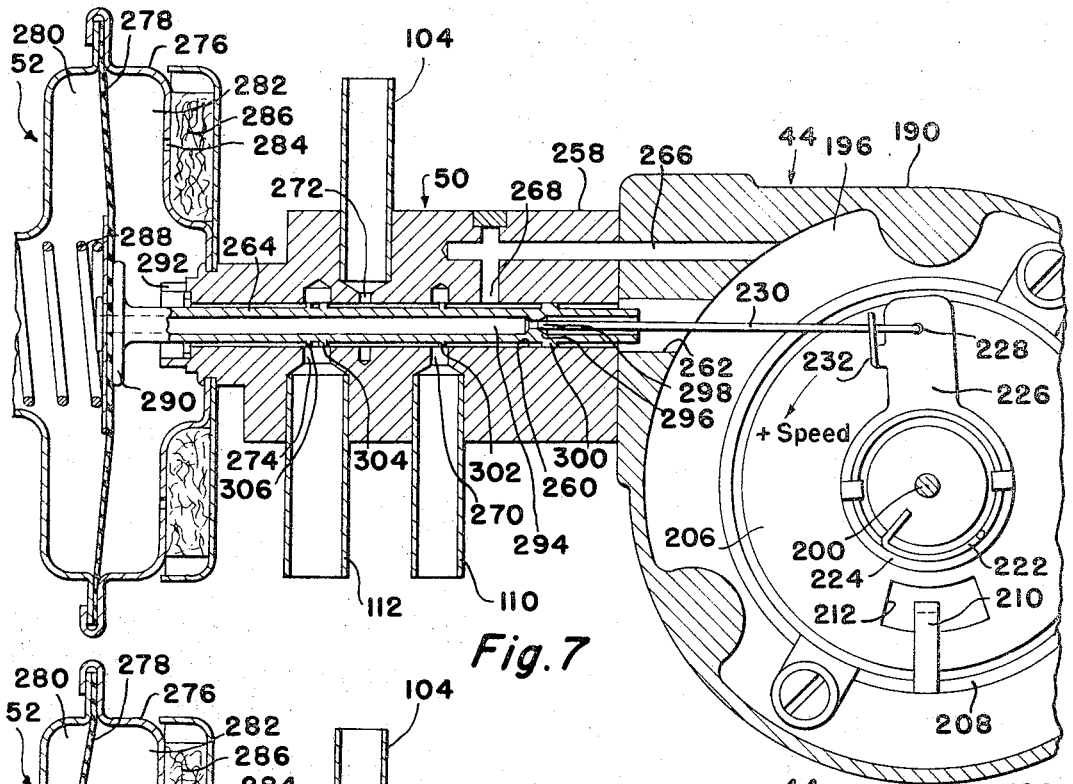
Figure 8:
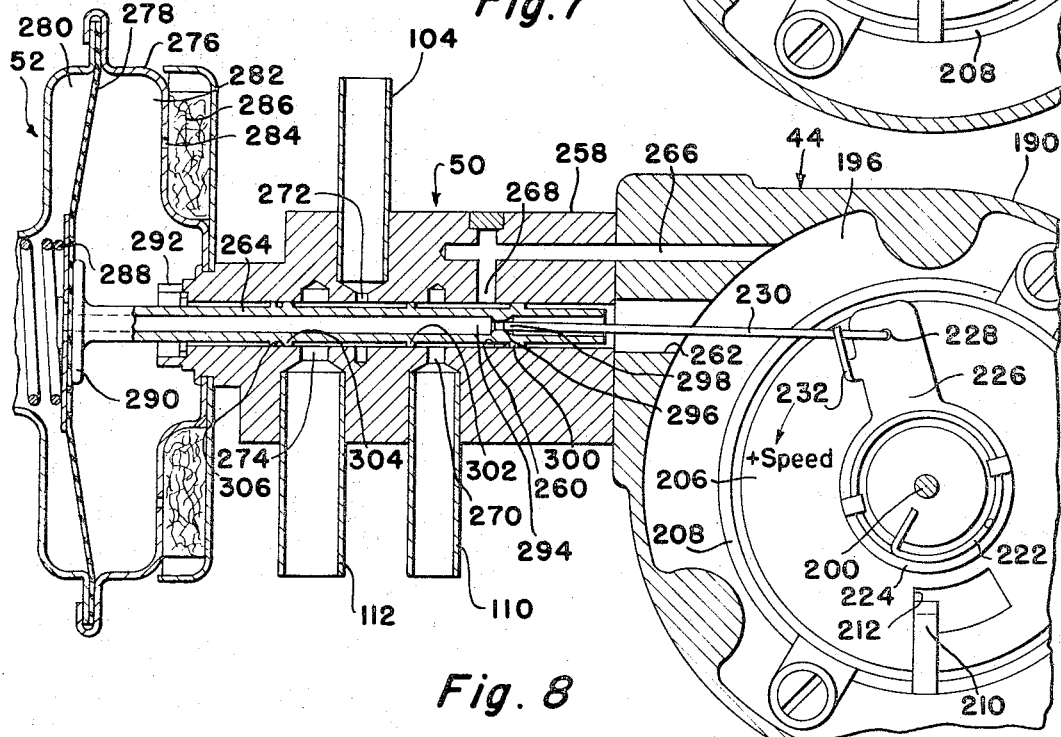

The control valve assembly 50 and the valve servo 52 are shown in FIGURES 5–8 in different conditions of operation. FIGURE 5 shows these assemblies when the vehicle is traveling well below the reference speed set into the system. FIGURE 6 shows these assemblies just before the vehicle has attained the reference speed. FIGURE 7 shows these assemblies when the vehicle is traveling at the reference speed. FIGURE 8 shows these assemblies when the vehicle speed has exceeded the reference speed.

The control valve assembly 50 includes a valve body 258 which is provided with a bore 260. The bore passes through the valve body and is in alignment with a bore 262 formed in a part of the speed sensor assembly housing 190 so that the rod 230 extends into the bore 260. The valve 264 is reciprocably mounted in bore 260. A passage 266 extending through housing 190 and valve body 258 interconnects chamber 196 of the speed sensor assembly and a port 268 intersecting bore 260 in the valve body. Another port 270 is provided adjacent port 268 in the valve body and is connected with the speed control conduit 110. Another port 272 is formed in valve body 258 adjacent port 270 and is connected with vacuum conduit 104. A fourth port 274 is formed adjacent port 272 in the valve body and is connected with the speed warning conduit 112. The end of the valve body opposite housing 190 provides a mounting for the valve servo assembly 52 and also for a fluid comunication with a portion of that assembly.

Assembly 52 includes a housing 276 divided by a diaphragm 278 into chambers 280 and 282. Chamber 280 may be referred to as a vacuum or variable pressure chamber, while chamber 282 may be referred to as at atmospheric or constant pressure chamber. Suitable inlets 284 are provided in a housing wall to connect chamber 282 to the atmosphere through a filter 286. The portion of the housing defining a wall of chamber 280 is connected to vacuum conduit 106 so that vacuum is provided to chamber 280 past the restriction 108. A spring 288 in chamber 280 reacts against the housing and the center portion of diaphragm 278 so that the diaphragm is urged to the right against atmospheric pressure in chamber 282, as seen in FIGURES 5–8. Valve 264 has an enlarged head 290 which is secured to the center of diaphragm 278 and sits on an annular castellated seat 292 formed on the end of valve body 258 received within chamber 282. One end of bore 260 therefore communicates at all times with atmospheric chamber 282 and the other end communicates at all times with atmospheric chamber 196 of the speed sensor assembly 44.

Valve 264 has a passage 294 extending centrally therethrough along the axis and formed near its right end to provide a valve seat 296. The valve 298, provided by the end of rod 230, may be seated on valve seat 296 to prevent passage of fluid through passage 294. Spaced lands 300, 302, 304 and 306 are provided on the exterior of the main body of valve 264 so that the peripheral surfaces of these lands are the only portions of the valve which engage the wall of bore 260. Lands 304 and 306 are closely adjacent each other so that they function as a single land insofar as control of fluid is concerned. Land 300 is adjacent the right end of the valve and positioned approximately in the same area as valve seat 296. Land 304 is sufficiently narrow so that when it is positioned centrally of either port 268 or port 270 it will permit communication between such port and both sides of the land. Lands 304 and 306 are so spaced that their outer sides are farther apart than the width of port 272 but closer together than the width of port 274.

When the valve head 290 of valve 264 is positioned to the extreme right as shown in FIGURE 5, it is engaged with the castellated seat 292. Lands 304 and 306 of the valve are positioned so as to close port 272 from bore 260. Land 302 is positioned to the right of port 268. Thus atmospheric pressure from chamber 282 is communicated through the left end of bore 260 to conduit 112. Atmospheric pressure from chamber 196 is communicated through passage 266, port 268, the space between lands 302 and 304, bore 260, and port 270, to conduit 110. This is the position of valve 264 when the vehicle is at rest or when it is well below the reference speed set by the operator. Under this condition, rod 230 is also to the right so that valve 298 is unseated. Thus atmospheric pressure from chamber 196 passes through passage 294 and communicates with variable pressure chamber 280. This eliminates any differential pressure effect on diaphragm 278 so that spring 288 holds valve 264 to the right.

Figure 2:
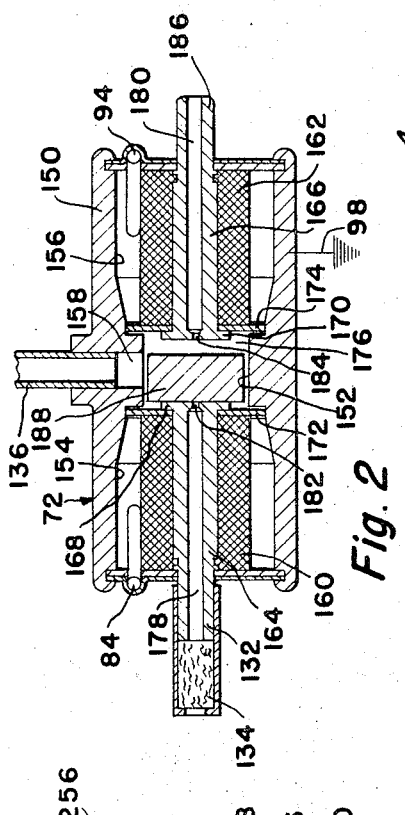
FIGURE 2 is an illustration of a portion of the system of FIGURE 1, with parts broken away and in section, showing the portion in greater detail.

When the vehicle is at complete rest, that is the engine 10 is not running and the vehicle is parked, the system is in the following condition. The reset switch 80, the pressure switch 76 and the brake switch 68 are open. The valve 188 in assembly 72 is positioned to the left as shown in FIGURE 2 so that the speed warning conduit 112 is fluid connected to conduit 136 through chamber 176. Atmospheric conduit 132 is closed by the valve. The valve 388 in the speed control assembly 74 is positioned to the right, closing the speed control conduit 110 and connecting conduit 114 with the atmosphere through conduit 128 and chamber 376. Since the various switches are open, none of the solenoid coils in either assembly 72 or 74 are energized. Therefore, the valves 188 and 388 are held in the positions noted by the permanent magnetism of the valves acting on the soft cores of the solenoids, as earlier described. Brake pedal 54 is in the released position and, therefore, the spoiler valve 62 is seated to close passage 60. The control valve assembly 50 is in the condition shown in FIGURE 5. Since atmospheric pressure is in the speed warning conduit 112, atmospheric pressure is found in servo 78 and in chamber 146 of the speed warning servomotor 42. Since conduit 114 is connected to atmospheric pressure, both chambers 124 and 126 of servomotor 34 are at atmospheric pressure.

The operator starts the vehicle engine and vacuum is generated in conduits 102, 104 and 106. However, due to the open valve 298 and the position of lands 304 and 306 in the control valve assembly 50, the valve 264 is not moved and no vacuum is introduced into either conduits 110 or 112. Since atmospheric pressure remains in servomotor 78, the pressure switch 76 remains open.

The operator then depresses the accelerator pedal 22 to control the vehicle in the usual manner. The pedal 22 acts through the throttle valve linkage to open the throttle valve and increase the power delivered by the engine so that the vehicle is accelerated. As the vehicle approaches the set speed, rod 230 is moved to the right by the spring retainer 226 in response to arcuate movement of the speed cup 206. The valve 298 formed by the end of rod 230 seats on valve seat 296, thus closing the atmospheric vent for chamber 280 of the control valve servomotor 52. This permits full vacuum to be exerted on one side of diaphragm 278 while atmospheric pressure remains on the other side of the diaphragm. The forces acting on the diaphragm are then therefore unbalanced and the diaphragm moves to the left against spring 288, moving valve 264 with it to the position shown in FIGURE 6. This valve movement takes place as a slave movement following the master movement of valve 298 until the set speed is reached. Therefore, shortly before the set or reference speed is reached, land 302 will have moved to the left so that port 268 is no longer connected with port 270. The land spacing is such that lands 304 and 306 have moved to the left so that port 272 is now connected with port 270. At the same time land 304 continues to block connection of port 272 with port 274. This condition is shown in FIGURE 6. Under this condition vacuum from conduit 104 is admitted to the speed control conduit 110. However, since valve 388 of assembly 74 has closed off conduit 110, no vacuum is introduced into conduit 114 or servomotor 34. As the reference speed is attained by the vehicle, the valve 298 has moved a slight amount farther to the left concurrently with similar movement of valve 264, so that land 302 is substantially centered in port 270, and lands 304 and 306 are similarly positioned with respect to port 274. Thus the control valve admits regulated pressure, which is less than atmospheric pressure, to conduits 110 and 112. Since the valve 388 of assembly 74 continue to be positioned so as to close conduit 110, atmospheric pressure remains in servomotor 34. However, valve 188 of assembly 72 is positioned to close the atmospheric inlet into chamber 176, while connecting conduit 112 with conduit 136. Therefore, regulated pressure in conduit 112 is transmitted through conduits 136, 138 and 140 through servomotors 78 and 42. Servomotor 78 then acts to close pressure switch 76. Servomotor 42 acts to move arm 40 to the right. This arm acts through the pin and slot lost motion connection 38 to pivot arm 36 to the right. This movement is transmitted to links 26 and 24, thus creating a back force on accelerator pedal 22 which is felt by the vehicle operator. If the operator continues to hold the pedal 22 down, links 24 and 26 will not actually move but the force will nevertheless be generated tending to move them to the closed throttle position. Thus the back force on the pedal acts as a speed warning signal to the operator. If the operator should release the pedal 22, this back force may be exerted to raise the pedal and close the throttle valve 12 until the vehicle speed is no longer above the reference speed.

At this time the operator may desire to continue to control the vehicle manually subject to the speed warning back pressure on the accelerator pedal. He can maintain the reference speed by keeping the accelerator pedal so positioned that it follows the back pressure exerted by servomotor 42. However, he will usually desire to condition the system so that it will operate in the speed maintaining mode, if driving conditions permit. To accomplish this, the operator manually closes the reset switch 80 while the system is in the speed warning condition of operation. Since switch 76 is closed at that time, the closing of reset switch 80 energizes the left solenoid 160 of assembly 72 and the right solenoid 362 of assembly 74. Since the energization of the solenoids acts to magnetize their coils so as to generate the same magnetic pole as that of the valves facing the pole, the valves 188 and 388 are repelled so that their positions are reversed. Thus the speed warning conduit 112 is closed by valve 188 and atmospheric pressure enters chamber 176 and conduit 136 through conduit 132. Atmospheric pressure is then transmitted to servomotor 42 and to the servomotor 78. At the same time, the atmospheric conduit 128 of assembly 74 is closed by valve 388 and the speed control conduit 110, which already has regulated vacuum in it, is connected to conduit 114 through chamber 376. Regulated vacuum is, therefore, exerted in chamber 126 of the speed control servomotor 34. This regulated vacuum from the control valve assembly 50 maintains the reference speed by acting on diaphragm 122 to control the movement of arm 30. There is no speed warning force exerted by servomotor 42 since both sides of its diaphragm are subjected to atmospheric pressure. Therefore, the spring acting on diaphragm 144 of that servomotor moves arm 40 to the left and the lost motion connection effectively removes the servomotor from the throttle valve control system. The control valve assembly is in the position shown in FIGURE 7 under this condition of operation. As the vehicle speed tends to increase, or decrease, due to changing load on the vehicle engine, the rod 230 is moved to slightly open, or close, valve 298 in relation to its valve seat 296, therefore causing valve 264 to follow the movement of the rod. Movement of valve 264 regulates the pressures in conduits 110 and 112 by modulating the vacuum from conduit 104 and at atmospheric pressure from chambers 282 and 196.

Although servomotor 78 opens switch 76, thereby de-energizing the solenoids which were energized by the closing of switch 80, the valves 188 and 388 remain in the same position due to the natural magnetic attraction as earlier discussed. Thus the system remains in the condition of operation without requiring the solenoids to be continually energized.

When the vehicle operator desires to disengage the system from the speed maintaining condition of operation, he is only required to apply the vehicle brakes. This results in two operations, either of which will fully disengage the system from the speed maintaining mode of operation. The normally open brake switch 68 closes, thereby energizing the right solenoid coil 162 of assembly 72 and the left solenoid coil 360 of the assembly 74. The valves 188 and 388 will again be repelled and will reverse their positions to the positions occupied by them when the vehicle is at rest. This will open the speed control servomotor chamber 126 to atmosphere through conduits 128, 114 and 118. It will also return the system to the speed warning condition of operation since the atmospheric conduit 132 of assembly 72 is closed by valve 188. At the same time that brake switch 68 is opened, the spring 64 of spoiler valve assembly 58 unseats valve 62 so that atmospheric pressure is introduced through passage 60 to conduits 116 and 118 to chamber 126 of the speed control servomotor. This disables the speed control servomotor 34 independently of any electrical operation of the system. A double safety release is thus provided.

When the operator releases the vehicle brakes, switch 68 is again opened, deenergizing the solenoids 162 and 360. However, due to the permanent magnetic attraction built into the valves 188 and 388, these valves remain in the same position. If the vehicle has been only slightly slowed down, vacuum may be in the speed control conduit 110 as shown in FIGURE 6. However, due to the position of valve 388 in assembly 74, this regulated vacuum cannot control the servomotor 34, even though the spoiler valve assembly 56 returns to the closed position. The operator must again actuate reset switch 80 in order to return the system to the speed control mode of operation.

What is claimed is:
1. A vehicle speed warning and speed maintaining system in a vehicle having an engine and an engine throttle and throttle control linkage including an accelerator pedal and a throttle closing spring, said system comprising:
    means sensing vehicle speed and a reference speed and generating a vehicle speed error signal;
    a master valve moving in accordance with said speed error signal;
    a first source of atmospheric pressure and a second source of pressure different from atmospheric pressure;
    slave valve means including a slave valve and a valve body receiving said slave valve and having pressure inlet means and first and second pressure outlet means controlled by said slave valve, said pressure inlet means receiving pressures from said pressure sources, and power means connected to move said slave valve in said valve body and controlled by said master valve;

said slave valve means generating a first modulated pressure from said pressure source pressures in said first pressure outlet means at a first predetermined vehicle speed error signal indicating a vehicle speed substantially equal to the reference speed, and connecting only the pressure from the second pressure source to said first pressure outlet means at a second vehicle speed error signal indicating a vehicle speed greater than the reference speed, and generating a second modulated pressure from said pressure source pressures in said second pressure outlet means at the first predetermined vehicle speed error signal, said modulated pressures varying in accordance with variations in the vehicle speed error signal;

a first pressure actuated servomotor connected with said linkage to exert a force thereon when actuated urging said linkage toward a throttle closing position;

a second pressure actuated servomotor connected with said linkage to exert a force thereon when actuated urging said linkage toward a throttle opening position;

and means selectively connecting said first pressure outlet means in pressure communication with said first servomotor and closing said second pressure outlet means and connecting said second servomotor in pressure communication with said first pressure source to deactuate said second servomotor and establish a speed warning mode of system operation, and selectively connecting said second pressure outlet means in pressure communication with said second servomotor and closing said first pressure outlet means and connecting said first servomotor in pressure communication with said first pressure source to deactuate said first servomotor and establish a speed maintaining mode of system operation.

2. The system of claim 1 further including control means responsive to the generation of said first modulated pressure with the system in the speed warning mode of operation to condition said selectively connecting means to establish the speed maintaining mode of system operation, and manually operated means operable through said control means to cause said selectively connecting means to establish the speed maintaining mode of system operation.

3. The system of claim 1 further including control means normally preventing the selective actuation of said selective connecting means to establish the speed maintaining mode of system operation and responsive to the delivery of a pressure to said first servomotor from said slave valve means to condition said selective connecting means for actuation to establish the speed maintaining mode of system operation.

4. In a fluid pressure system for association with first and second sources of fluid at different pressures, the combination of first and second fluid-pressure-differential responsive force-producing means each having a first chamber and a movable element responsive to the difference in the pressure of the first source and the pressure in the first chamber;

means for selectively establishing fluid pressures in each of said first chambers and comprising first valve means connected to the first sources and a passageway, control valve means including a fluid pressure inlet connected with said second source and additional fluid pressure inlet means connected with said first source and second valve means and fluid pressure outlet means, third fluid-pressure-differential responsive force-producing means having a second chamber and a movable element responsive to the difference in the pressure of the first source and the pressure in the second chamber for controlling said second valve means, means connecting said second chamber to said second source and said first valve means passageway, and means including said second valve means selectively connecting said fluid pressure outlet means to one of said first chambers.

5. The combination of claim 4, in which the fluid pressure in said second chamber exerts a force on said second valve means tending to maintain said valve means in a position preventing fluid from said second source from entering said fluid pressure outlet means, and in which the reduction of pressure in said second chamber reduces the force upon said second valve means in response to closing action of said first valve means tending to cause said second valve means to connect said fluid pressure inlet and said fluid pressure outlet means.

6. The combination of claim 4 wherein said second valve means is formed to provide the passageway to which said first valve means is connected.

7. The combination of claim 4 in which fluid pressure in said second chamber increases in response to the opening of said first valve means and produces a closing force on said second valve means resulting in a pressure increase in said fluid pressure outlet means.

8. The combination of claim 4, said means selectively connecting said fluid pressure outlet means to each of said first chambers including third and fourth valve means alternatively positioned to connect one of said first chambers and said fluid pressure outlet means and the other of said chambers and said first source.

9. The combination of claim 4, said first valve means including a valve member responsive to a signal controlled at least in part by the force-producing action of one of said first and second fluid-pressure-differential responsive force-producing means.

10. In a vehicle control system controlling the vehicle engine in accordance with a reference vehicle speed, means generating a first fluid pressure and a second fluid pressure each reflecting vehicle speed error, means receiving said first fluid pressure and means receiving said second fluid pressure, a first fluid pressure operated servomotor connected to control the vehicle engine and a second fluid pressure operated servomotor connected to control the vehicle engine, and means selectively and alternatively connecting said first fluid pressure receiving means to said first fluid pressure servomotor and said second fluid pressure receiving means to said second fluid pressure servomotor.

11. The mechanism of claim 10, said fluid pressure generating means generating a substantially constant fluid pressure in said first fluid pressure receiving means when vehicle speed error indicates a vehicle speed greater than the reference speed.

12. The mechanism of claim 10, said alternative connecting means venting the unconnected of the two servos to atmosphere.

13. In a fluid-pressure-responsive apparatus, a body having a first chamber therein, means for controllably changing the fluid pressure in said first chamber, a movable power wall forming a wall of said first chamber and movable with respect to said body in response to changes in the fluid pressure in said first chamber, movable first valve means connected with and movable by said power wall, movable second valve means having a valve seat on said first movable valve means and included as a part of said means for controllably changing the fluid pressure in said first chamber, servomotor means having a second chamber and a second power wall defining one wall of said second chamber, said first valve means controllably changing the fluid pressure in said second chamber, and means connected with and actuated by said second power wall operatively controlling the action of said second valve means.

14. The mechanism of claim 13 further including second servomotor means having a third chamber and a third power wall forming one wall of said third chamber, said first valve means controlling change in said third chamber, and means alternatively connecting said first valve means to said first servomotor means and said second servomotor means and rendering inactive the servomotor means not so connected.

15. In a governing system for association with a vehicle having a rotatable element rotating at a velocity which varies with the velocity of the vehicle and a throttle movable under the control of an operator in one direction to increase the velocity of the vehicle and in another direction to decrease the velocity of the vehicle, the combination of means including first fluid-pressure differential actuated force-producing means coupled to the throttle and effective upon the establishment of a pressure differential of a predetermined magnitude to exert a force tending to move the throttle in one of said directions, second fluid-pressure differential actuated force-producing means coupled to the throttle and effective upon the establishment of a pressure differential of a predetermined magnitude to exert a force tending to move the throttle in the other of said directions, a fluid pressure responsive control valve assembly including a variable pressure chamber and a fluid pressure displaceable element movable by fluid pressure in said chamber and valve means movable by said displaceable element to move said control valve to control the pressure differentials established across said first and second force-producing means, means controlling the pressure in said control valve assembly variable pressure chamber in accordance with the relationship of the velocity of the vehicle to a reference vehicle velocity, and means selectively and alternatively connecting said control valve assembly to said first and second fluid pressure actuated force-producing means.

References Cited

UNITED STATES PATENTS 2,692,980 10/1954 Platt _____ 180—82.1 X
2,916,100 12/1959 Teetor _____ 180—82.1
3,203,447 8/1965 Bremmer et al. __ 137—625.65 X KENNETH H. BETTS, *Primary Examiner.*